US012668196B2

(12) United States Patent
Jacobo et al.

(10) Patent No.: US 12,668,196 B2
(45) Date of Patent: Jun. 30, 2026

(54) VEHICLE RACK ASSEMBLY AND METHOD OF CONFIGURING A VEHICLE RACK

(71) Applicant: Ford Global Technologies, LLC, Dearborn, MI (US)

(72) Inventors: Ulises Jacobo, Naucalpan de Juarez (MX); Edvair Cruz, Ocoyoacac (MX); Pablo Trejo, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 18/152,800

(22) Filed: Jan. 11, 2023

(65) Prior Publication Data

US 2024/0227685 A1     Jul. 11, 2024

(51) Int. Cl.
B60R 9/045          (2006.01)

(52) U.S. Cl.
CPC ..................................... B60R 9/045 (2013.01)

(58) Field of Classification Search
CPC ....................................................... B60R 9/045
USPC .......................................................... 224/403
See application file for complete search history.

(56) References Cited

U.S. PATENT DOCUMENTS

| | | | | |
|---|---|---|---|---|
| 2,635,615 A | * | 4/1953 | Rice | B60R 9/045 296/210 |
| 2,965,424 A | * | 12/1960 | Baney | B60R 9/045 108/14 |
| 3,002,664 A | * | 10/1961 | Guevara | B60R 9/045 224/314 |
| 3,201,186 A | * | 8/1965 | Noonan | A47B 31/06 312/258 |
| 3,589,576 A | * | 6/1971 | Rinkle | B60R 9/00 296/108 |
| 4,601,419 A | * | 7/1986 | Bird | B60R 9/00 224/318 |
| 4,770,458 A | * | 9/1988 | Burke | B60R 9/00 296/3 |
| 5,190,337 A | * | 3/1993 | McDaniel | B60P 3/42 296/3 |
| 5,398,985 A | | 3/1995 | Robinson | |
| 5,480,205 A | * | 1/1996 | Tayar | B60R 9/042 296/3 |
| 6,009,642 A | | 1/2000 | Nugent | |
| 6,017,082 A | | 1/2000 | Leoni | |
| 6,557,917 B1 | * | 5/2003 | Colcombe | B60J 10/17 224/403 |
| 6,890,014 B1 | | 5/2005 | King et al. | |
| 6,983,968 B2 | * | 1/2006 | Brauer | B62D 33/0207 224/500 |
| 7,111,886 B1 | | 9/2006 | Miller et al. | |
| 7,475,928 B1 | * | 1/2009 | Clum | B60R 21/00 296/1.04 |
| 7,488,021 B1 | | 2/2009 | Roos et al. | |
| 7,537,264 B2 | | 5/2009 | Maimin et al. | |

(Continued)

*Primary Examiner* — Peter N Helvey

(74) *Attorney, Agent, or Firm* — Vichit Chea; Carlson, Gaskey & Olds, P.C.

(57)     ABSTRACT

A rack assembly for a vehicle, includes a deployable rack that connects to a vehicle; and a pivotable section of the deployable rack. The pivotable section is configured to pivot back-and-forth between a stowed position and a deployed position. The pivotable section in the stowed position is disposed over a window of a cab. The pivotable section in the deployed position is disposed over a roof of the cab.

18 Claims, 6 Drawing Sheets

(56) References Cited

U.S. PATENT DOCUMENTS

| | | | | |
|---|---|---|---|---|
| 7,641,251 | B1 * | 1/2010 | Stepanians | B60P 3/40 |
| | | | | 296/3 |
| 7,753,615 | B1 | 7/2010 | Sprague | |
| 7,946,457 | B2 | 5/2011 | Kramer | |
| 8,087,716 | B2 | 1/2012 | Kramer | |
| 8,191,952 | B2 * | 6/2012 | Mokhtari | B60P 3/42 |
| | | | | 296/3 |
| 8,285,611 | B2 | 10/2012 | Fuller et al. | |
| 8,322,779 | B2 | 12/2012 | Kramer | |
| 8,348,331 | B2 | 1/2013 | Holt | |
| 8,403,191 | B2 | 3/2013 | Russo | |
| 8,668,124 | B2 * | 3/2014 | Kennedy | B60R 9/045 |
| | | | | 224/403 |
| 8,864,001 | B2 * | 10/2014 | Langseder | B60P 3/40 |
| | | | | 296/3 |
| 8,955,880 | B2 * | 2/2015 | Malcolm | B62D 33/0207 |
| | | | | 224/500 |
| 9,056,589 | B2 | 6/2015 | Timmermann et al. | |
| 9,227,491 | B1 | 1/2016 | Story, Jr. et al. | |
| 9,682,733 | B2 | 6/2017 | Krishnan et al. | |
| 9,688,127 | B2 | 6/2017 | Hemphill et al. | |
| 9,868,382 | B2 | 1/2018 | Aghili et al. | |
| 9,889,728 | B2 | 2/2018 | Chapman et al. | |
| 10,421,345 | B2 | 9/2019 | Kerspe et al. | |
| 10,464,492 | B1 | 11/2019 | Linn et al. | |
| 10,632,934 | B2 | 4/2020 | Linn et al. | |
| 11,279,421 | B1 | 3/2022 | Hoogendoorn et al. | |
| 2006/0191105 | A1 | 8/2006 | Walker | |
| 2006/0290165 | A1 | 12/2006 | Grudek | |
| 2008/0048429 | A1 * | 2/2008 | German | B60P 7/16 |
| | | | | 280/770 |
| 2017/0200197 | A1 | 7/2017 | Brubaker | |
| 2017/0349039 | A1 | 12/2017 | Rayner et al. | |
| 2018/0134227 | A1 * | 5/2018 | Klar | B60R 9/058 |
| 2022/0080897 | A1 | 3/2022 | Carbone et al. | |
| 2022/0080898 | A1 | 3/2022 | Jordan et al. | |
| 2022/0242211 | A1 | 8/2022 | Cruckshank | |
| 2023/0173990 | A1 * | 6/2023 | Ni | B60P 7/15 |
| | | | | 224/403 |

* cited by examiner

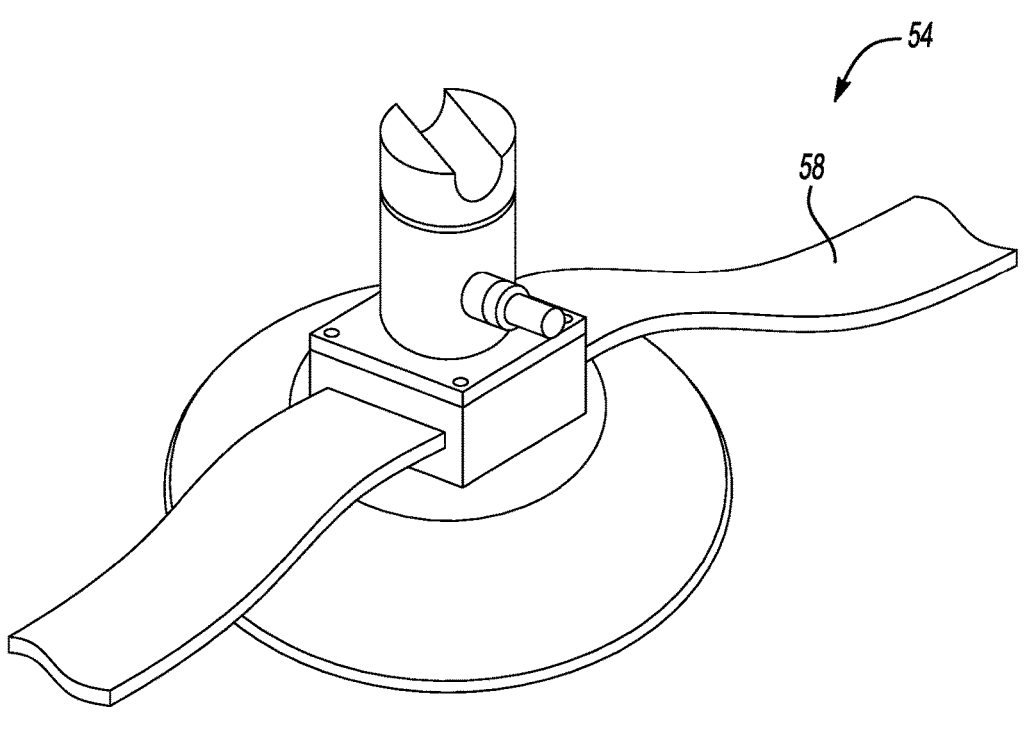
_Fig-5_
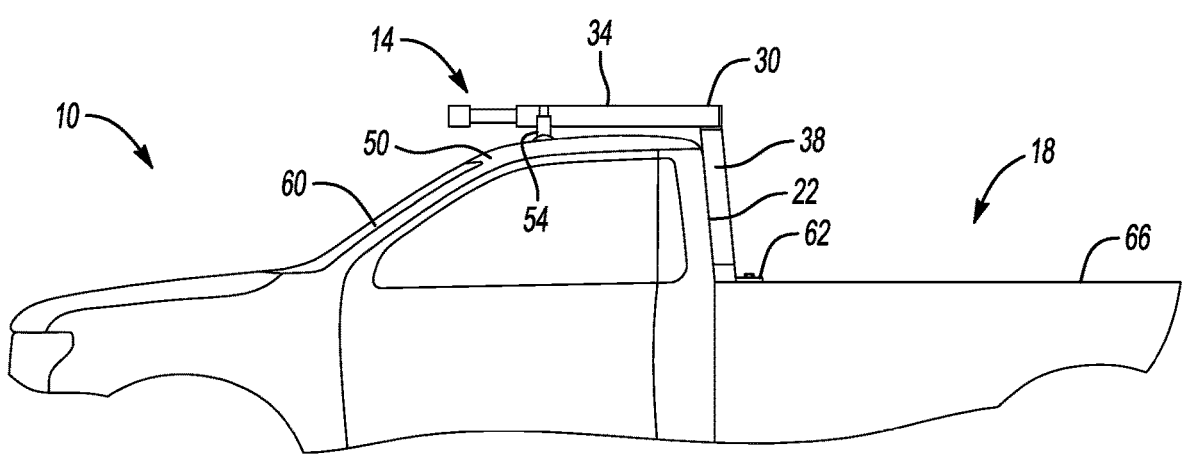
_Fig-6A_

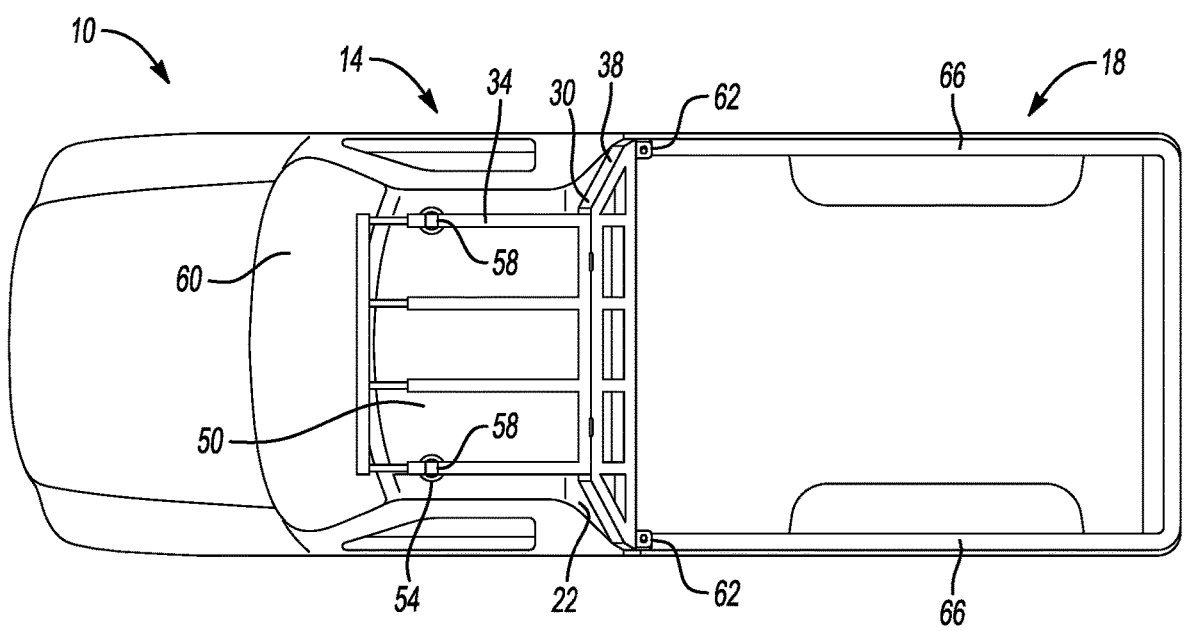
_Fig-6B_
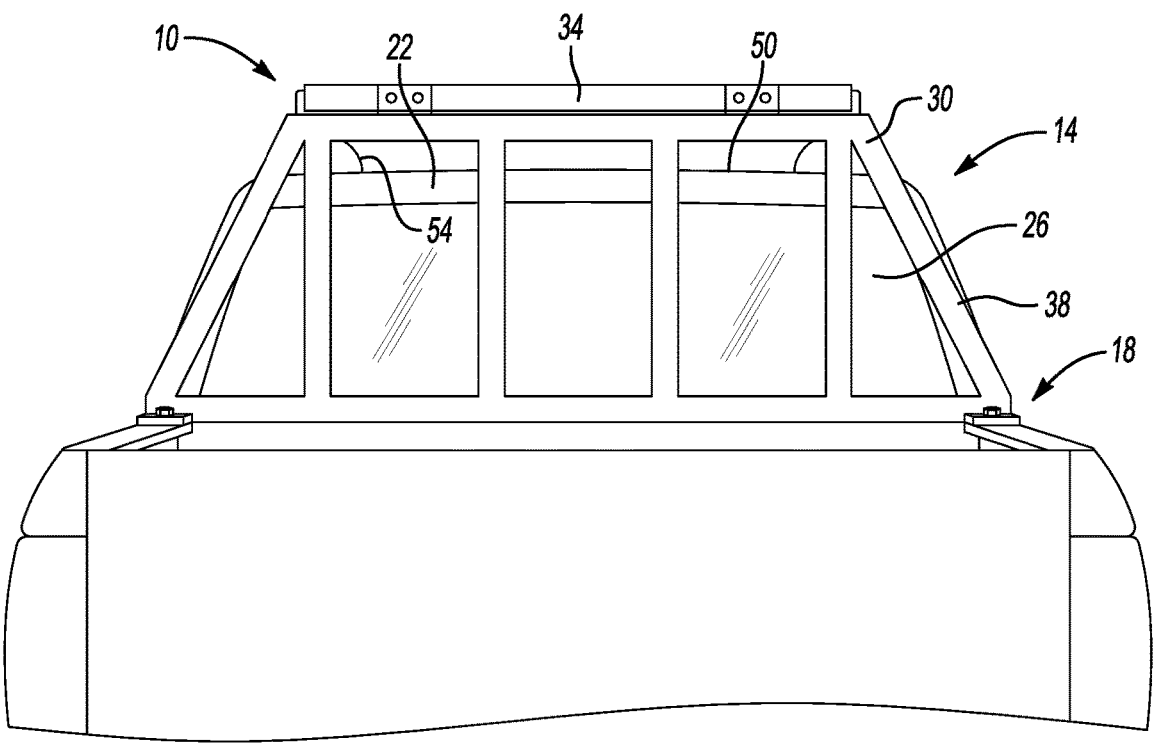
_Fig-6C_

VEHICLE RACK ASSEMBLY AND METHOD OF CONFIGURING A VEHICLE RACK

TECHNICAL FIELD

This disclosure relates generally to a rack for a vehicle and, more particularly, to a rack that protects a window of the vehicle and can pivot to a position that provides a roof rack for the vehicle.

BACKGROUND

A typical pickup truck has a cab providing a passenger compartment and a cargo bed providing a cargo area. A cab back can separate the passenger compartment from the cargo area. The cab back can include a rear window assembly that is vertically above the cargo bed.

SUMMARY

In some aspects, the techniques described herein relate to a rack assembly for a vehicle, including: a deployable rack that connects to a vehicle; and a pivotable section of the deployable rack, the pivotable section configured to pivot back-and-forth between a stowed position and a deployed position, the pivotable section in the stowed position disposed over a window of a cab, the pivotable section in the deployed position disposed over a roof of the cab.

In some aspects, the techniques described herein relate to an assembly, wherein the cab is a pickup truck cab.

In some aspects, the techniques described herein relate to an assembly, wherein the window is a rear window of the cab.

In some aspects, the techniques described herein relate to an assembly, wherein the deployable rack connects to a cargo bed of the vehicle.

In some aspects, the techniques described herein relate to an assembly, wherein the pivotable section is vertically aligned when in the stowed position and is horizontally aligned when in the deployed position.

In some aspects, the techniques described herein relate to an assembly, wherein the pivotable section is configured to extend and retract.

In some aspects, the techniques described herein relate to an assembly, wherein, when the pivotable section is in the deployed position, the pivotable section can telescopically extend forward such that a portion of the pivotable section extends forward to provide additionally rack surface area past a portion of a windshield of the vehicle. In crew-cab vehicles, the portion of the pivotable section, when extended, may not extend past the windshield.

In some aspects, the techniques described herein relate to an assembly, further including a stationary section of the deployable rack, the stationary section configured to connect to the vehicle, the pivotable section pivotably coupled to the stationary section.

In some aspects, the techniques described herein relate to an assembly, wherein a vertically lower side of the stationary section is configured to connect to a cargo bed front wall, a cargo bed side wall, or both.

In some aspects, the techniques described herein relate to an assembly, wherein the stationary section is vertically above a cargo bed of the vehicle when the stationary section is connected directly to the vehicle.

In some aspects, the techniques described herein relate to an assembly, wherein the stationary section and the pivotable section are folded against each other and span over the window of the cab when the pivotable section is in the stowed position, wherein the pivotable section spans over the roof of the cab and is unfolded from the stationary section when in the deployed position.

In some aspects, the techniques described herein relate to an assembly, wherein the pivotable section is configured to pivot relative to the stationary section about an axis that is vertically above the roof of the cab.

In some aspects, the techniques described herein relate to a method of configuring a vehicle rack, including: pivoting a pivotable section of a deployable rack from a stowed position to a deployed position, the pivotable section in the stowed position disposed over a window of a cab, the pivotable section in the deployed position disposed over a roof of the cab.

In some aspects, the techniques described herein relate to a method, wherein the pivoting is about an axis that is vertically above the roof of the vehicle.

In some aspects, the techniques described herein relate to a method, wherein the pivotable section is vertically aligned when in the stowed position and is horizontally aligned when in the deployed position.

In some aspects, the techniques described herein relate to a method, further including, when the pivotable section is in the deployed position, extending the pivotable section forward.

In some aspects, the techniques described herein relate to a method, further including, when the pivotable section is in the deployed position, extending the pivotable section forward past a portion of a windshield of the vehicle.

In some aspects, the techniques described herein relate to a method, wherein the pivotable section of the deployable rack is folded against a stationary section of the deployable rack when the pivotable section is in the stowed position.

In some aspects, the techniques described herein relate to a method, wherein, when the pivotable section is in the stowed position, the pivotable section and the stationary section are folded against each other and disposed between a cargo bed of the vehicle and a rear window of a cab of a vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIGS. 1A-3C illustrate respective side, top, and rear views of a vehicle equipped with a rack assembly that has a pivotable section in a stowed position.

FIG. 2 illustrates a rear view of the rack assembly of FIGS. 1A-1C.

FIGS. 3A-3C illustrate respective side, top, and rear views of the vehicle and the rack assembly of FIGS. 1A-1C when the pivotable section is in a deployed position.

FIG. 5 illustrates a suction cup assembly used to hold the rack assembly in the deployed position of FIGS. 3A-3C.

FIGS. 6A-6C illustrate respective side, top, and rear views of the vehicle and the rack assembly of FIGS. 1A-1C when the pivotable section is in the deployed position and is also extended.

DETAILED DESCRIPTION

Figure 1A:
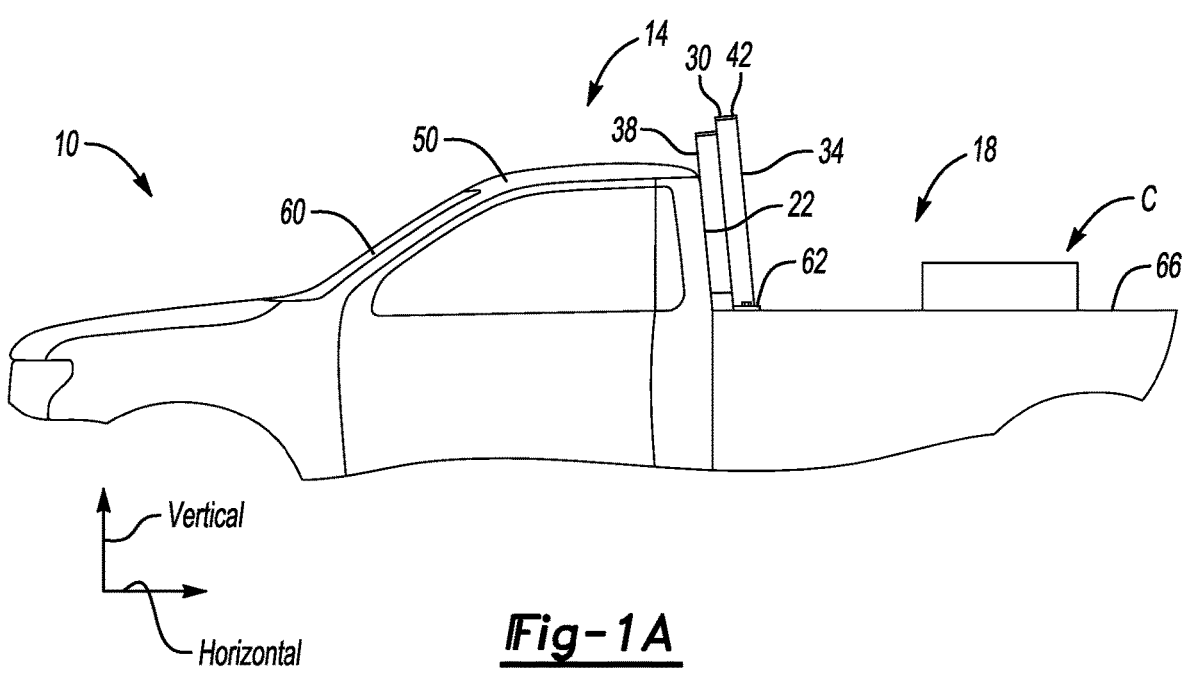

This disclosure relates generally to a rack assembly for a vehicle. More particularly, the disclosure relates to a rack assembly having a section that can pivot back-and-forth between a deployed position and a stowed position. In the deployed position, the rack assembly can provide a roof rack. The disclosed rack assembly is particularly appropriate for pickup trucks having a cab and a cargo bed aft the cab.

With reference to FIGS. 1A-1C and 2, a vehicle 10 includes a cab 14 and a cargo bed 18. The vehicle 10 is a pickup truck, in this example, so the cab 14 can be considered a pickup truck cab. The cab 14 includes a back wall 22 having a rear window 26. The rear window 26 is vertically above the cargo bed 18.

The example vehicle 10 is a unibody truck. Thus, the back wall 22 provides a front wall of the cargo bed 18 in addition to providing the back wall 22 of the cab 14.

In another example, the vehicle 10 is a body-on-frame style pickup where a wall separate from the back wall 22 provides the front wall of the cargo bed. The wall providing the front wall of the cargo bed in the body-on-frame configured pickup truck can be spaced rearward from the back wall of the cab.

Forward and rearward, for purposes of the disclosure, are with reference to the general orientation of the vehicle 10. Further, vertical and horizontal, for purposes of the disclosure, are with reference to ground and a general orientation of the vehicle 10 during ordinary operation.

The vehicle 10 is equipped with a deployable rack 30 disposed over the rear window 26. The deployable rack 30 can be a metal or metal alloy, such as aluminum. The deployable rack 30 can instead or additionally include plastic parts. The deployable rack 30 can, among other things, protect the rear window 26 when cargo C is loaded into the cargo bed 18 or when transporting cargo, especially larger items such as ladders.

The pivotable section 34 is pivotably connected to the stationary section 38 via at least one hinge 42. Two hinges 42 are used in this example. The pivotable section 34 is folded against the stationary section 38 when the pivotable section is in a stowed position shown in FIGS. 1A-1C and 2. When in the stowed position, the pivotable section 34 and the stationary section 38 are folded against each other and are disposed between the cargo bed 18 and the rear window 26.

The pivotable section 34 can pivot relative to the stationary section 38 about an axis A, which is vertically above the rear window 26. The pivotable section 34 can pivot about the axis A to a deployed position as shown in FIGS. 3A-3C and 4. In the deployed position, the pivotable section 34 is disposed over a roof 50 of the cab 14 to provide a roof rack.

Suction cup assemblies 54 (FIG. 5) can be mounted to the roof 50, the pivotable section 34, or both to align the pivotable section 34 and to protect the roof 50 when the pivotable section 34 is flipped from the stowed position to the deployed position. In another example, bumpers are used instead of the suction cup assemblies 54.

The suction cup assemblies 54 can include a strap 58 that helps to fix, attach, and hold the pivotable section 34 in the deployed position. The suction cup assemblies 54 can be quickly and easily mounted on the roof of the vehicle.

Cargo can be strapped to the pivotable section 34 when the pivotable section 34 is in the deployed position. The stationary section 38 remains disposed over the rear window 26 when the pivotable section 34 is pivoted from the stowed position of FIGS. 1A-1C to the deployed position of FIGS. 3A-3C.

The stationary section 38 is secured directly to the vehicle 10. In particular, the deployable rack 30 includes feet 62 that extend from the stationary section 38. The feet 62 are secured to the vertically upward facing surfaces of the side walls 66.

The stationary section 38 spans over the cargo bed 18 when secured to the side walls 66. In another example, the stationary section 38 could be secured to a front wall of the cargo bed 18 instead of or in addition to the front wall.

In the deployed position, the pivotable section 34 is horizontally aligned and unfolded from the stationary section 38. In the stowed position, the pivotable section 34 is vertically aligned and folded against the stationary section 38. The stationary section 38 extends vertically above the cargo bed 18 when the stationary section 38 is connected directly to the vehicle 10.

In this example, the pivotable section 34 can, when in the deployed position, telescopically extend and retract. FIGS. 3A-3C and 4 show the pivotable section 34 in the retracted position. FIGS. 6A-6C show the pivotable section 34 in the extended position. In the extended position, the example pivotable section 34 extends a leading edge of the pivotable section 34 is forward past a portion of a windshield 60 of the vehicle 10. In a crew-cab vehicle, the pivotable section 34 may not extend past a portion of the windshield 60 when extended.

Figure 1B:
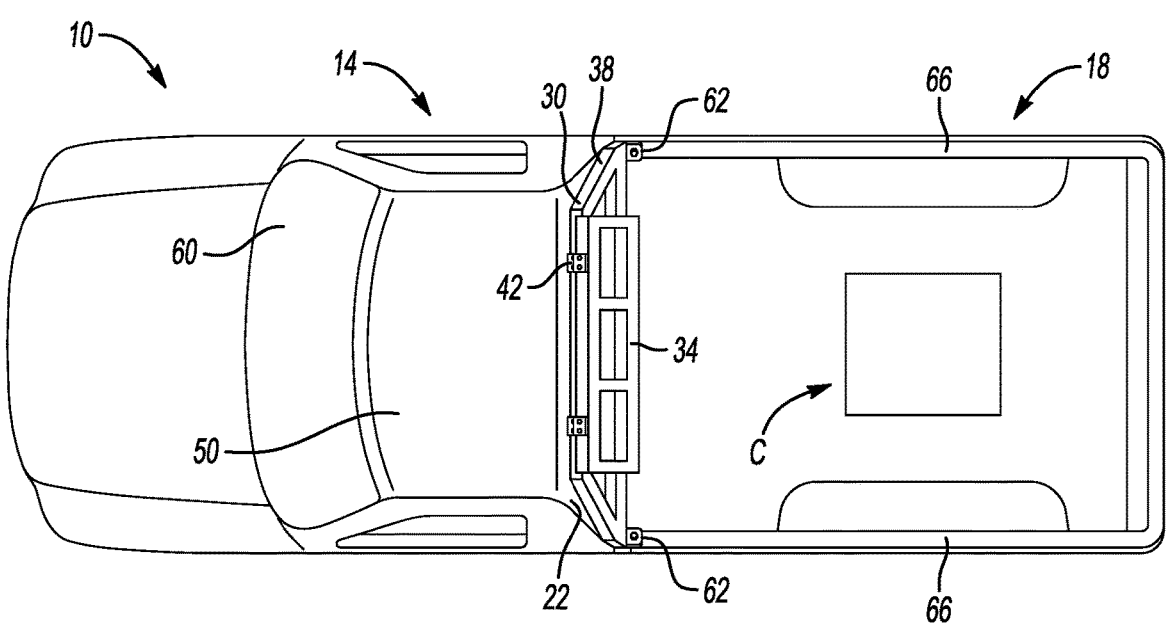
Figure 1C:
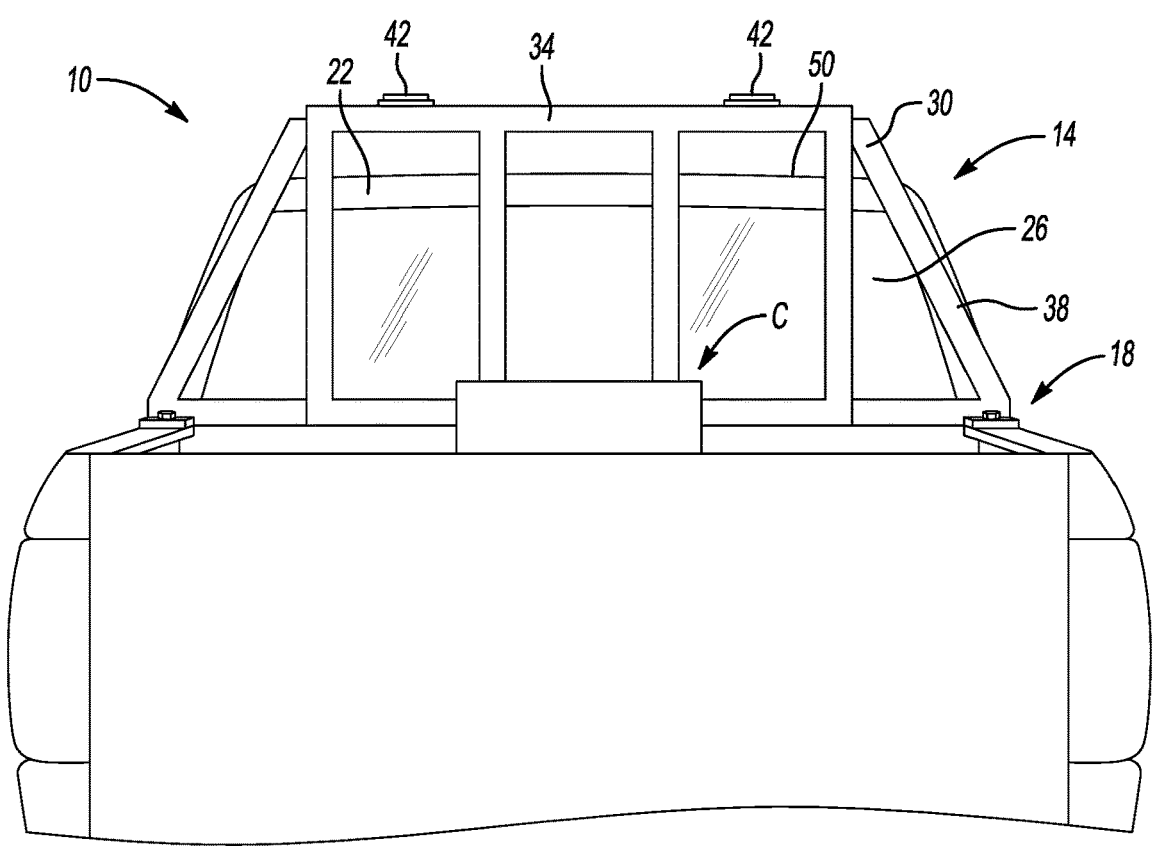
Figure 2:
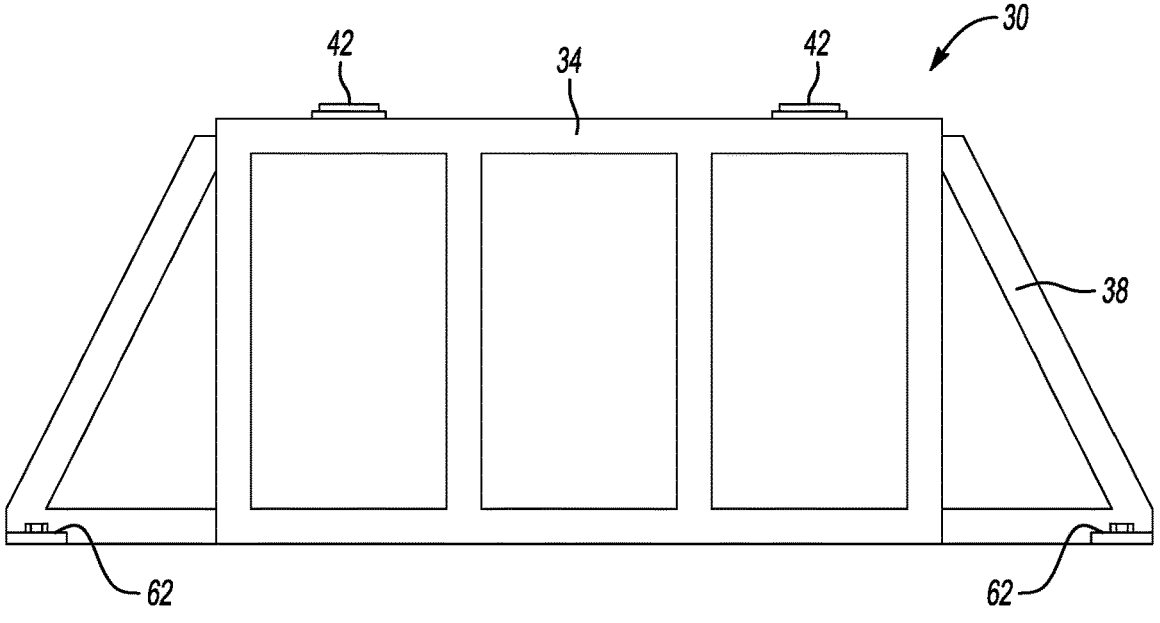
Figure 3A:
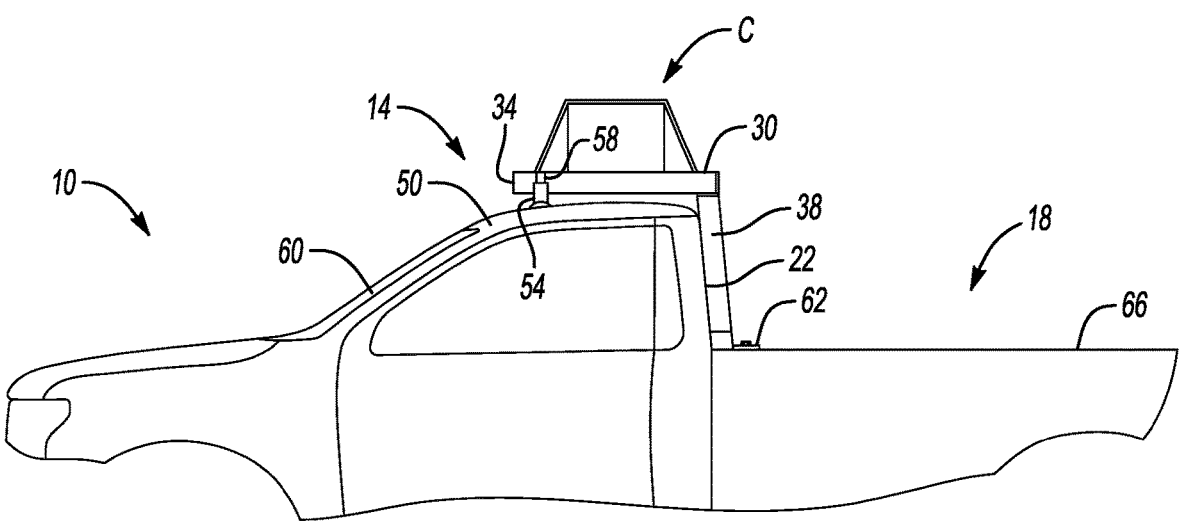
Figure 3B:
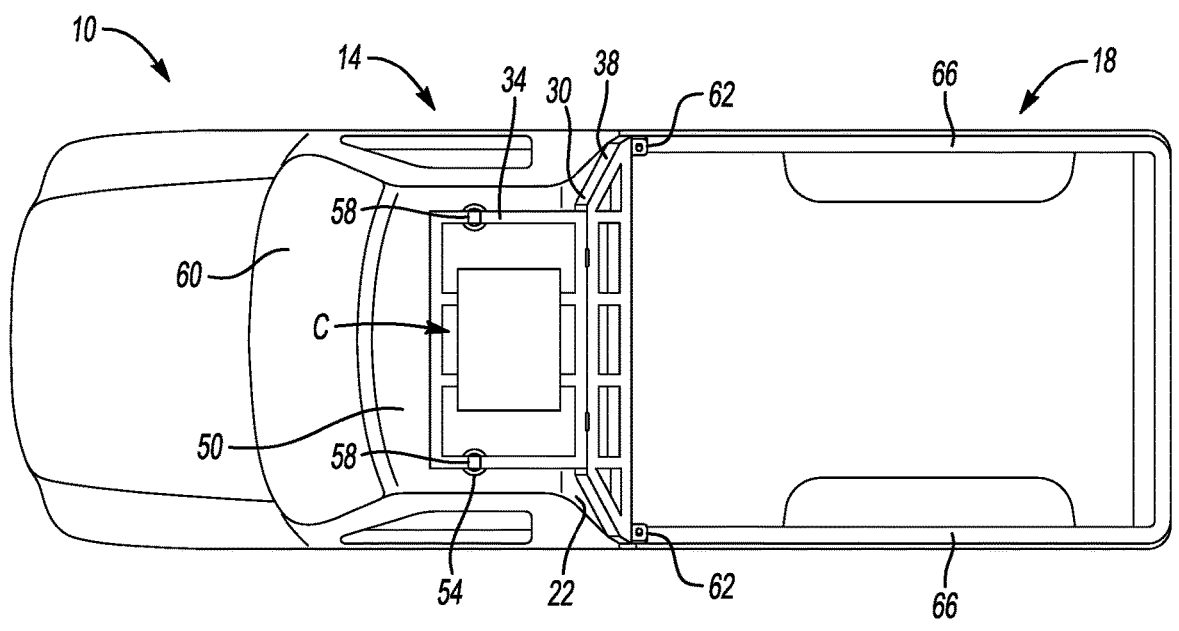
Figure 3C:
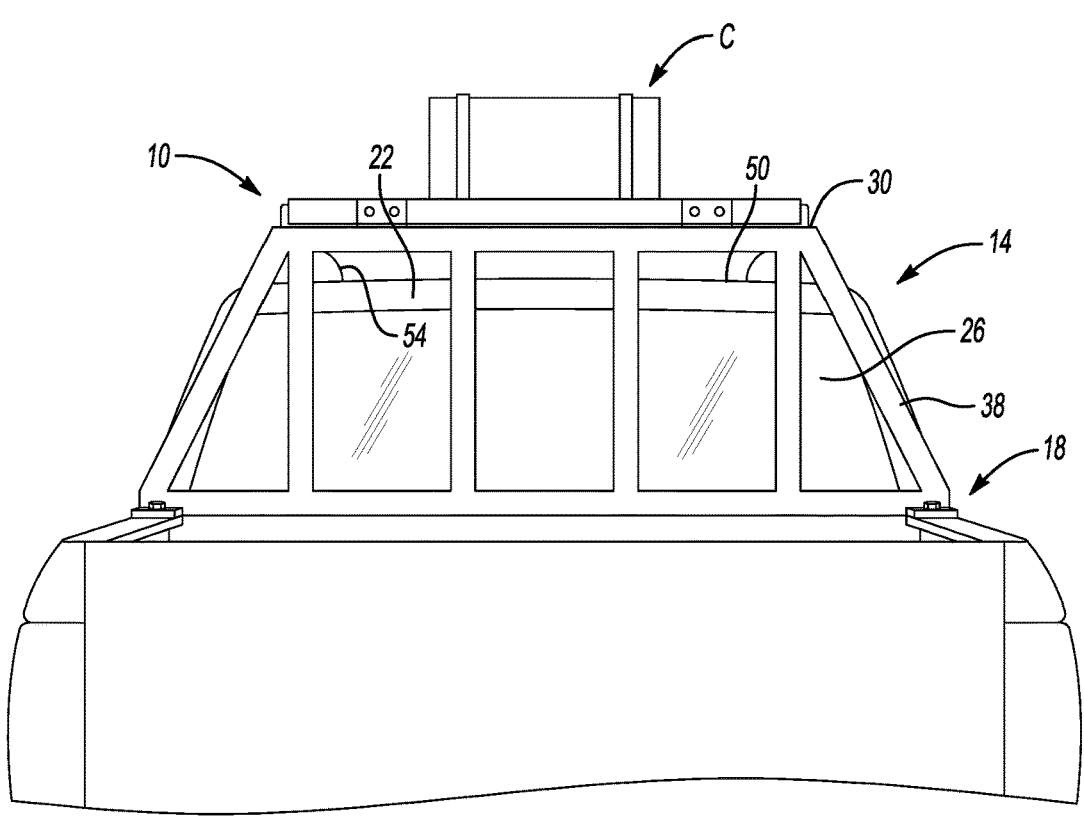
Figure 4:
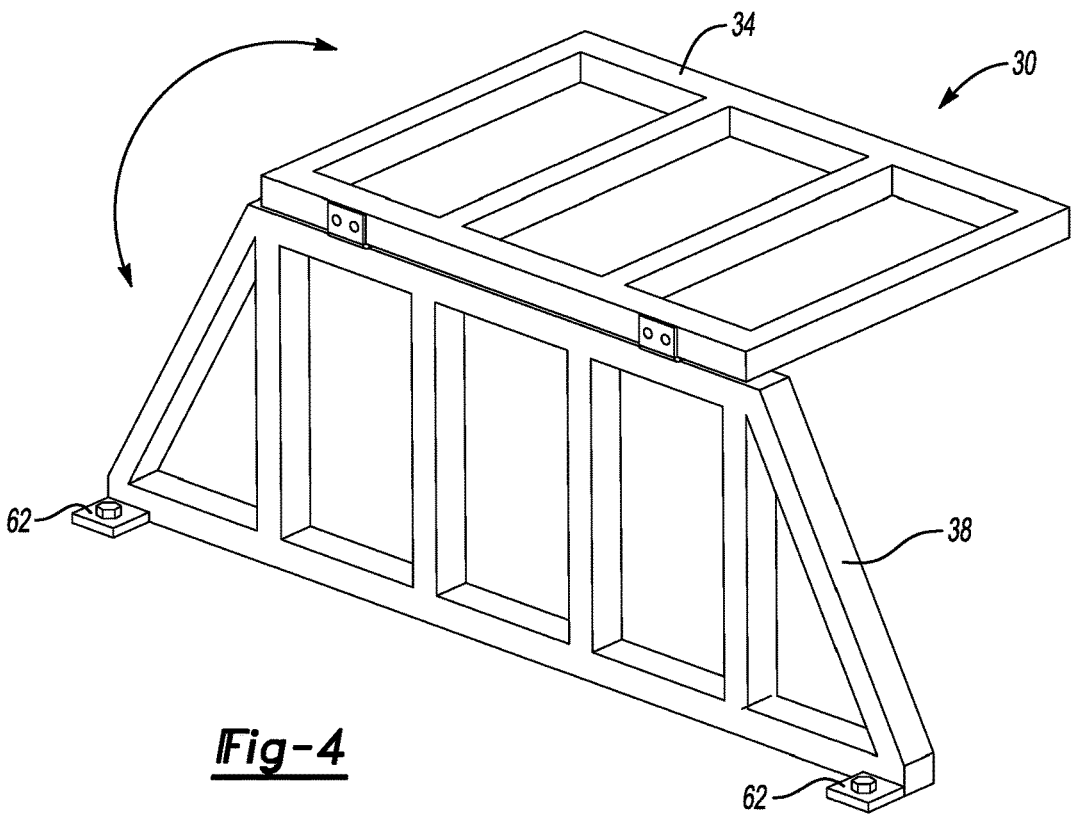
FIG. 4 illustrates a perspective view of the rack assembly in the deployed position of FIGS. 3A-3C.

A method of configuring the deployable rack 30 of this disclosure can include pivoting the pivotable section 34 the stowed position of FIGS. 1A-1C to the deployed position of FIGS. 3A-3C. Cargo C can then be mounted on the pivotable section 34.

Features of this disclosure relate to a deployable rack that can be deployed to provide multi-level options for securing cargo. The deployable rack also covers the back glass of a cab. Existing vehicles can be retrofitted to include the deployable rack.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A rack assembly for a vehicle, comprising:
   a deployable rack that connects to a vehicle;
   a pivotable section of the deployable rack, the pivotable section configured to pivot back-and-forth between a stowed position and a deployed position, the pivotable section in the stowed position disposed over a window of a cab, the pivotable section in the deployed position disposed over a roof of the cab; and
   a stationary section of the deployable rack, the stationary section configured to connect to the vehicle, the pivotable section pivotably coupled to the stationary section, the stationary section disposed over the window of the cab when the pivotable section is in the deployed position and when the pivotable section is in the stowed position, wherein the pivotable section is configured to pivot relative to the stationary section about an axis that is vertically above the roof of the cab.

2. The assembly of claim 1, wherein the cab is a pickup truck cab.

3. The assembly of claim 1, wherein the window is a rear window of the cab.

4. The assembly of claim 1, wherein the deployable rack connects to a cargo bed of the vehicle.

5. The assembly of claim 1, wherein the pivotable section is vertically aligned when in the stowed position and is horizontally aligned when in the deployed position.

6. The assembly of claim 1, wherein the pivotable section is configured to extend and retract.

7. The assembly of claim 6, wherein, when the pivotable section is in the deployed position, the pivotable section can telescopically extend forward such that a portion of the pivotable section extends forward past a portion of a windshield of the vehicle.

8. The assembly of claim 1, wherein a vertically lower side of the stationary section is configured to connect to a cargo bed front wall, a cargo bed side wall, or both.

9. The assembly of claim 1, wherein the stationary section is vertically above a cargo bed of the vehicle when the stationary section is connected directly to the vehicle.

10. A rack assembly for a vehicle, comprising:
a deployable rack that connects to a vehicle;
a pivotable section of the deployable rack, the pivotable section configured to pivot back-and-forth between a stowed position and a deployed position, the pivotable section in the stowed position disposed over a window of a cab, the pivotable section in the deployed position disposed over a roof of the cab; and
a stationary section of the deployable rack, the stationary section configured to connect to the vehicle, wherein the stationary section and the pivotable section are folded against each other and span over the window of the cab when the pivotable section is in the stowed position, wherein the pivotable section spans over the roof of the cab and is unfolded from the stationary section when in the deployed position.

11. The assembly of claim 1, wherein the pivotable section and the stationary section are folded against each other when the pivotable section is in the stowed position.

12. The assembly of claim 1, wherein the stationary section and the pivotable section overlap with each other when the pivotable section is in the stowed position.

13. The assembly of claim 1, further comprising one or more suction cup assemblies that hold the pivotable section in the deployed position, the suction cup assemblies mounted to the roof of the cab.

14. The assembly of claim 13, wherein the suction cup assemblies each include a strap that holds the pivotable section in the deployed position.

15. A rack assembly for a vehicle, comprising:
a deployable rack that connects to a vehicle;
a pivotable section of the deployable rack, the pivotable section configured to pivot back-and-forth between a stowed position and a deployed position, the pivotable section in the stowed position disposed over a window of a cab, the pivotable section in the deployed position disposed over a roof of the cab; and
a stationary section of the deployable rack, the stationary section configured to connect to the vehicle, the pivotable section folded against the stationary section when the pivotable section is in the stowed position.

16. The assembly of claim 15, wherein the stationary section and the pivotable section are both disposed over the window of the cab when the pivotable section is in the stowed position.

17. The assembly of claim 15, wherein the stationary section and the pivotable section overlap with each other when the pivotable section is in the stowed position.

18. The assembly of claim 15, wherein the stationary section and the pivotable section overlap with each other when the pivotable section is in the stowed position, the stationary section and the pivotable section overlapping with each other at a position directly aft the window of the cab.

* * * * *